United States Patent [19]
Drone et al.

[11] 3,788,419
[45] Jan. 29, 1974

[54] VEHICLE FRAME INCLUDING RADIATOR AND FAN MOUNTING

[75] Inventors: Gary A. Drone; James M. Schnepp, both of Springfield, Ill.

[73] Assignee: Allis-Chalmers Corporation, Milwaukee, Wis.

[22] Filed: Nov. 16, 1972

[21] Appl. No.: 307,053

[52] U.S. Cl. ............................................. 180/68 R
[51] Int. Cl. ........................................... B60k 11/04
[58] Field of Search . 180/54 A, 68 R, 68 P; 165/44, 165/41

[56] References Cited
UNITED STATES PATENTS

| | | | |
|---|---|---|---|
| 1,533,982 | 4/1925 | Firkins | 180/68 R |
| 1,840,417 | 1/1932 | Seelert | 180/68 R X |
| 2,099,789 | 11/1937 | Baker et al. | 180/68 P |
| 2,117,040 | 5/1938 | Schjolin | 180/54 A |
| 2,755,874 | 7/1956 | Adloff | 180/68 R |
| 2,787,065 | 4/1967 | Bock et al. | 172/808 |
| 2,962,107 | 11/1960 | Mihal et al. | 180/68 R |
| 2,965,187 | 12/1960 | Zeman | 180/69 R |
| 3,565,203 | 2/1971 | Ashton et al. | 180/68 R |

*Primary Examiner*—David Schonberg
*Assistant Examiner*—Milton L. Smith
*Attorney, Agent, or Firm*—Charles L. Schwab; Robert B. Benson; Kenneth C. McKivett

[57] ABSTRACT

The vehicle frame has a radiator support including a pair of transversely spaced vertical walls rigidly interconnected by a transverse vertical wall with fan opening. A transverse beam is also rigidly interconnected to the spaced vertical walls and supports a radiator fan operatively disposed in the fan opening. The radiator is releasably secured to the transverse vertical wall on resilient mounts and is readily removable from the vehicle upon removal of protective panels. The transverse beam serves to support a tightener for a belt drivingly connecting the fan to an engine power take-off shaft. The outer ends of the transverse beam carry brackets for the cylinders of a pair of bulldozer lift jacks.

10 Claims, 5 Drawing Figures

VEHICLE FRAME INCLUDING RADIATOR AND FAN MOUNTING

BACKGROUND OF THE INVENTION

Heretofore various means have been employed for mounting a radiator on a vehicle. However, the various prior arrangements have not been entirely satisfactory particularly from the standpoint of ease of removal of the radiator. In prior constructions in which the fan is mounted on the engine it has been necessary to provide substantial fan-to-shroud clearance particularly in those vehicles in which the engine is resiliently supported on the vehicle frame. Such clearance results in reduced fan efficiency. Also the radiator fan belts have not been easily installed and removed in many prior vehicle constructions. Heretofore it has been suggested that a transverse beam member be utilized to tie together opposite vertical walls of the radiator guard and to support lift jacks for a bulldozer. One such construction is shown in U.S. Pat. No. 2,787,065, G. E. Bock et al., Convertible Pump Mount and Lubrication Arrangmeent, issued Apr. 2, 1957. Such construction does not provide the advantages of the present invention which will hereinafter be discussed.

BRIEF DESCRIPTION OF THE INVENTION

The support for the radiator and fan includes a pair of spaced vertical walls rigidly secured at their bottom ends to main frame of the vehicle and a transverse wall rigidly interconnecting the vertical walls and presenting an opening through which air may be drawn by the fan. The support also includes a transverse beam extending between and rigidly interconnecting the vertical walls. The radiator is releasably secured to the transverse wall by resilient mounts and can be readily removed from the vehicle upon removal of radiator protective panels. The laterally opposite ends of the transverse beam carry a pair of lift jacks for a bulldozer or the like. The beam also supports a fan and a belt tightener for the belt interconnecting an engine power takeoff shaft and the fan. The fan belt may be installed or removed without removing any other components and without passing the belt over the fan. Since the radiator fan is rotatably mounted on the same structure to which the fan shroud is connected, the fan-to-shroud clearance may be held to a relatively close fit thereby increasing the fan efficiency.

BRIEF DESCRIPTION OF THE DRAWINGS

One embodiment of the present invention is illustrated in the attached drawings in which:

FIG. 3 is a section view taken along the line III—III in FIG. 1;

FIG. 4 is a section view taken along the line IV—IV in FIG. 1; and

DETAILED DESCRIPTION OF THE INVENTION

Figure 1:
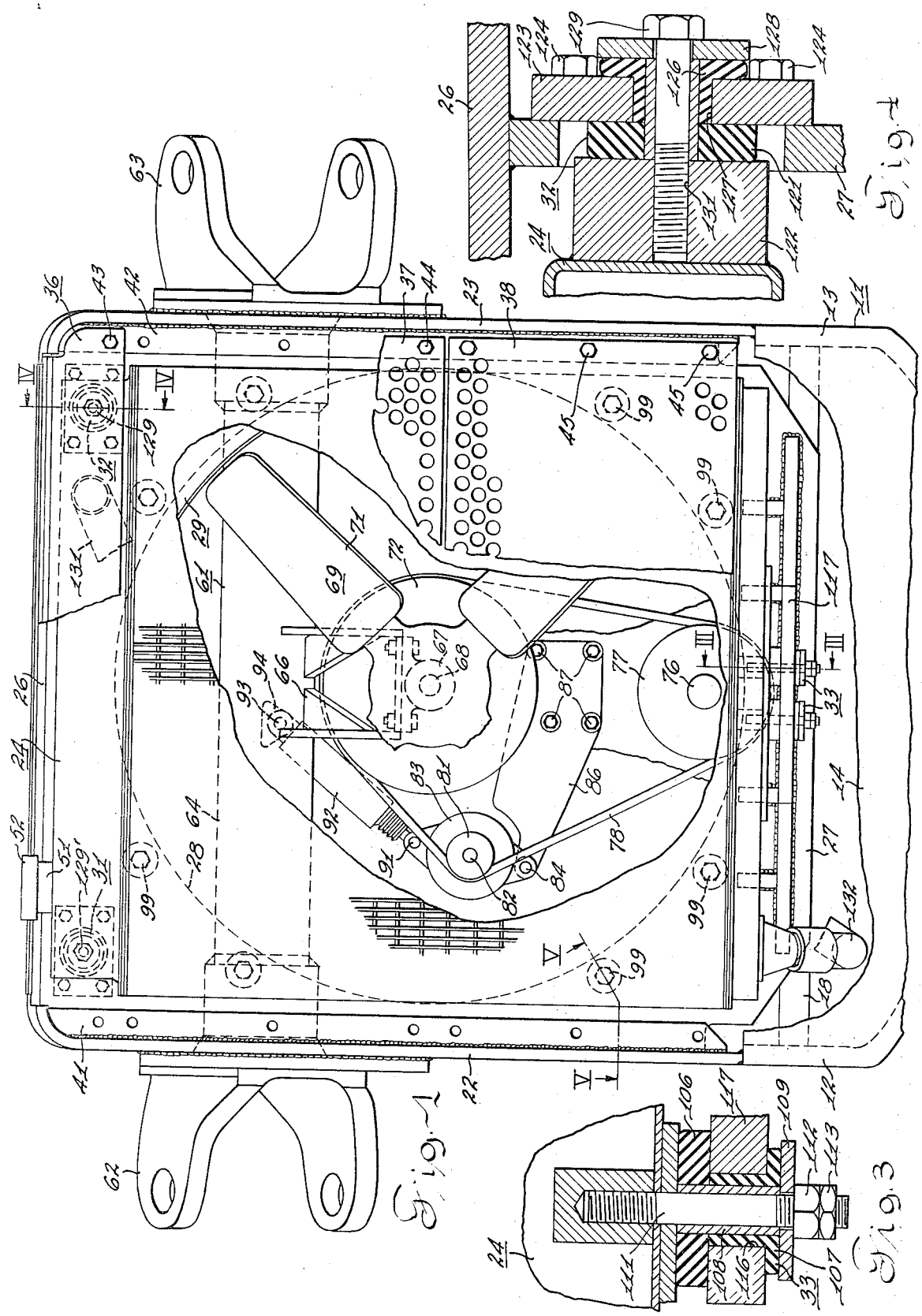
FIG. 1 is a front view of part of a crawler tractor in which the present invention is incorporated with certain parts broken away for purposes of illustration.
Figure 2:
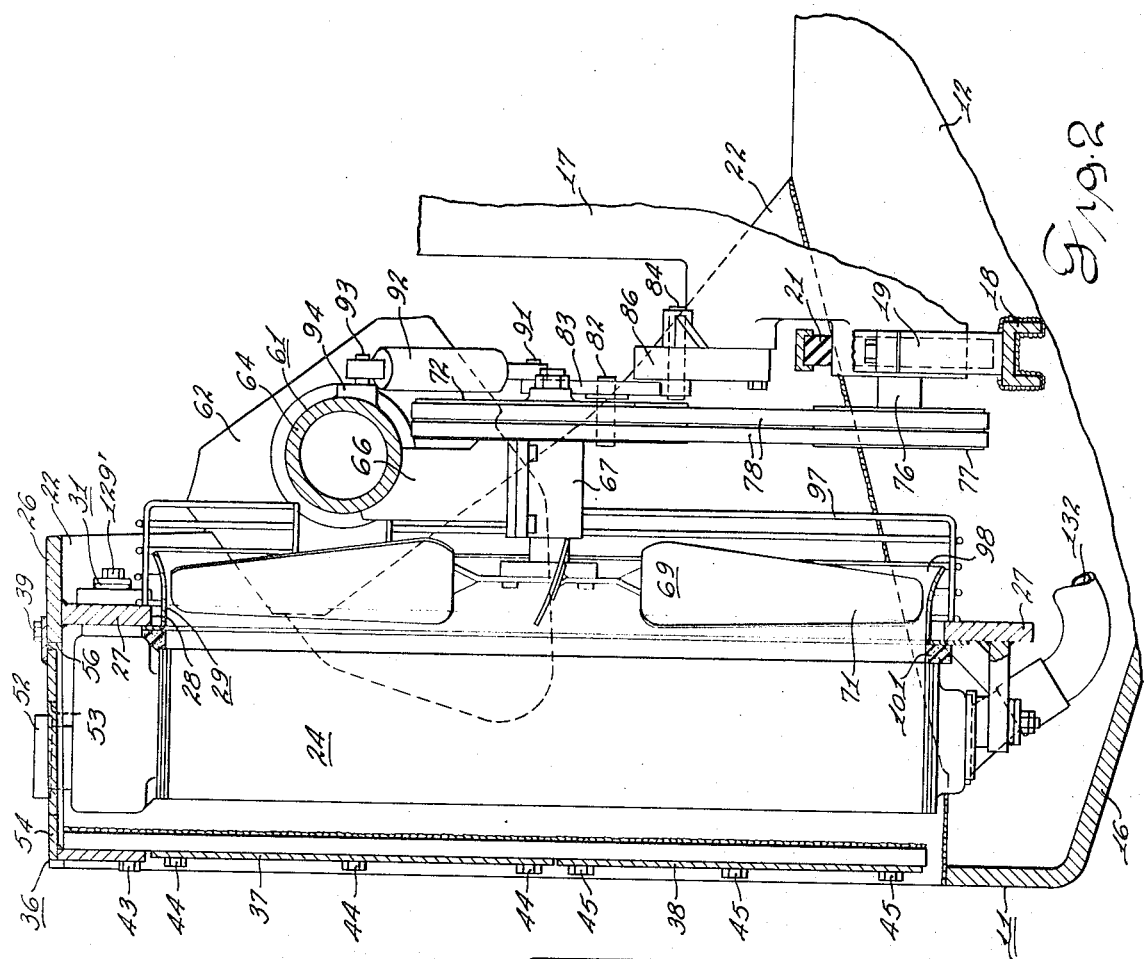
FIG. 2 is a side view of the structure shown in FIG. 1 with parts broken away for illustration purposes.

The present invention is illustrated by the drawings in a crawler tractor which, as shown in FIGS. 1 and 2, includes a main frame 11 having a pair of vertical sidewalls 12, 13, a front wall 14 and a bottom wall 16. An engine 17 is resiliently supported on a frame cross brace 18 by a split retainer 19 in which a resilient collar 21 is mounted. The brace 18 is secured to the walls 12 and 13 by suitable means, such as be welding. The other longitudinal end of the engine 17 is suitably mounted on the frame 11 by means not shown. Although the construction illustrated in FIG. 2 is the front end of a crawler tractor it should be understood that in modern construction machinery vehicle design the radiator may be mounted on either end of the vehicle. A pair of transversely spaced vertical walls 22, 23 are secured as be welding at their lower ends to the vertical walls 12 and 13, respectively, of the vehicle frame 11. These walls 22, 23 are in generally parallel relation to one another and extend upwardly on opposite sides of a radiator 24. The upper ends of the walls 22, 23 are interconnected by a horizontally extending top wall 26 and in the illustrated embodiment of the invention the top wall 26 is formed integrally with the vertical walls 22, 23. In other words the walls 22, 23 and 26 comprise an inverted U radiator support and protecting structure. A transverse vertical wall 27 is welded at its laterally opposite ends to the vertical walls 22 and 23, respectively, and is welded at its top edge to the top wall 26. The transverse vertical wall 27 includes a longitudinally disposed annular opening 28 in which a shroud structure 29 is disposed.

The radiator 24 is releasably secured to the transverse vertical wall 27 by a pair of resilient mounts 31, 32 at transversely spaced upper rear portions of the radiator and by a pair of resilient mounts 33 at the central bottom portion of the radiator.

A three part radiator protective structure is provided for the radiator comprising a top protective panel 36, an intermediate protective panel 37 and a lower protective panel 38. The upper protective panel 36 is releasably secured to the top wall 26 by a plurality of capscrews 39 and additionally is releasably secured by capscrews 43 to a pair of brackets 41, 42 welded to the inner sides of walls 22 and 23, respectively. The intermediate panel 37 is releasably secured to the brackets 41, 42 by capscrews 44 and the bottom panel 38 is releasably secured to the brackets 41, 42 by capscrews 45. The panels 37, 38 have a plurality of annular air passages facilitating movement of air through the radiator 24. The radiator 24 includes a filler tube 51 and cap 52 which extend upwardly through a suitable opening 53 in the radiator protective panel 36. It will be noted that the top panel 36 includes a top plate 54 disposed in a cutout portion 56 in the top wall 26 of the radiator support structure. This cutout portion leaves an opening sufficiently wide to permit the radiator to be withdrawn upwardly therethrough upon removal of the radiator protective penels 36, 37 and 38.

A transverse beam 61 extends between and is rigidly secured, as by welding, to the vertical walls 22, 23. The beam 61 includes a cylindrical tube 64 and a pair of hydraulic jack brackets 62, 63 welded to the opposite transverse ends of the tube 64. The brackets 62, 63 are suitably welded to the walls 22, 23 and are adapted to receive the cylinder components of a pair of hydraulic lift jacks for a dozer or the like. The transverse beam 61 includes a downwardly extending fan shaft supporting structure 66 welded to the tube 64 which includes a bearing block 67 in which a shaft 68 of a fan 69 is rotatably supported. The fan blades 71 are ridigly secured at their radially inner ends to a hub which in turn is secured to the shaft 68. The rear end of the shaft 68 carries a suitable V-belt pulley 72. The engine includes a front end power takeoff shaft 76 to which a V-belt pulley 77 is secured for rotation therewith. It should be understood that the power takeoff shaft may be an end portion of the engine crank shaft. A pair of V-belts 78 are reeved over the pulleys 72, 77 and also over an idler pulley 81 pivotally mounted on a shaft 82 secured to a pulley support member 83. The support member 83 is pivotally connected at its lower end by a pin 84 to an outer end of a bracket 86 secured to the engine by capscrews 87. The upper end of the pulley support member 83 is pivotally connected by a pin 91 to the lower end of a resiliently expansible and contractable tensioning mechanism 92 which has its upper end pivotally connected by a pin 93 to a bracket 94 secured by welding to the tube 64. As is apparent from the drawings the V-belts 78 may be removed from and installed on the pulleys 72, 77 and 81 without removal of any of the associated components. For instance the fan belts 78 need not be passed over the fan blades as is sometimes required in other vehicles wherein the fan is mounted on the engine. Accordingly the fan guards 96, 97 need not be removed from the transverse wall 27, to which secured by capscrews not shown, when it is necessary to replace the fan belts 78.

Figure 5:
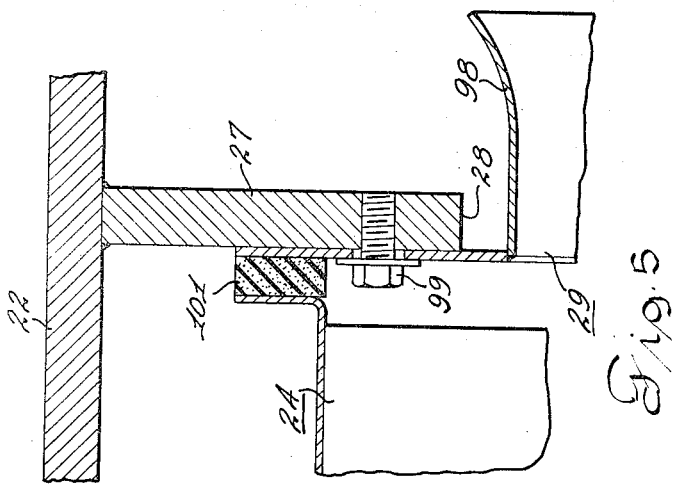
FIG. 5 is a section view taken along the line V—V in FIG. 1.

Inasmuch as the fan 69 is rotatably supported on the radiator support structure rather than the engine, the fan may be fitted more closely to a fan shroud 98 of the shroud structure 29. Since the shroud structure is rigidly secured to the transverse wall 27 by capscrews 99, as shown in FIGS. 1 and 5, the shroud and fan will not shift position relative to one another, as would be the case if the fan were mounted on the resiliently supported engine 17. As shown in FIGS. 1, 2 and 5, the shroud structure 29 includes a sealing strip 101 which suitably seals the radiator periphery to the transverse wall 27. Thus air pumped by the fan 69 will be forced to pass through the cooling coils of the radiator 24.

As shown in FIGS. 1 and 3 the resilient mounts 33 at the central bottom of the radiator 24 include a flexible washer 106 and a grommet 107 held in operative position by a sleeve 108, a washer 109, a stud 111 and nuts 112, 113. The stud is threaded into a suitable drilled and tapped opening in the bottom of the radiator. The grommet 107 has a sleeve portion fitting within a vertical opening 116 in a bracket 117 welded to the lower end of the transverse wall 27. The upper mounts 31, 32 are identical in construction. The details of construction of the mount 32 are shown in FIG. 4. The mount 32 includes a flexible washer 121 disposed between a block 122 on the radiator 24 and a plate 123 secured by cap screws 124 to the upper part of the transverse wall 27. A flexible grommet 126 has a sleeve portion within a longitudinal opening 127 in the plate 123 and a radial flange between the plate 123 and a washer 128. The mount 32 is held in place by a capscrew 129 threadedly engaging a drilled and tapped opening 131 in the block 122 on the radiator 24. The mounts 31, 32, 33 provide an effective three point mount for the radiator which minimizes torsional stressing of the radiator should deflection of the radiator support occur.

When it is desired to remove the radiator 24, the protective panels 36, 37, 38 are removed, the top and bottom hoses 131, 132 are removed, nuts 112, 113 are removed from the studs 111 and the capscrews 129, 129' are unscrewed from the radiator 24. By tilting the radiator forward slightly, the radiator may be lifted from its lower mounts 33 upwardly through the opening 56 in the top wall 26. This radiator guard and support greatly facilitates removal of large radiators that are too heavy to lift manually. Such radiators are normally removed with one of various types of overhead hoists or lifting devices.

From the foregoing description of the illustrated embodiment of this invention it is apparent that a highly desirable radiator and fan support has been provided. Since the fan and its shroud are mounted on the radiator support, relative movement is minimized, thus allowing closer fan blade tip to shroud clearance. This close fit provides superior fan efficiency. Also the mounting of the fan on the tube 64, eliminates passing the fan belts over the fan during installation, or removal. This makes servicing easier. The tube 64 provides a convenient anchor for one end of the spring-type belt tensioning mechanism 92. The transverse wall 27 not only braces the side walls 22, 23 against side loads but also provides a mount for the shroud 98 and seal 101 and supports the radiator 24 through mounts 31, 32, 33.

The embodiments of the invention in which an exclusive property or privilege is claimed are defined as follows:

1. In a motor vehicle having a main frame supporting an engine with a power takeoff shaft, the combination comprising:
   a radiator,
   a support for said radiator including
      a pair of transversely spaced vertical walls rigidly secured at their bottom ends to said main frame,
      a transverse wall extending between and rigidly secured to said vertical walls and including a longitudinal opening,
      radiator mounting means releasably securing said radiator to said support at one longitudinal side of said transverse wall and in confronting relation to said longitudinal opening, and
   a transverse beam extending between and rigidly interconnecting said vertical walls, said beam being disposed on the longitudinal side of said transverse wall opposite to said one side,
   an air shroud structure on said transverse wall encompassing said opening including an annular fan shroud with an annular opening,
   a fan rotatably supported on said transverse beam and disposed within said shroud whereby upon rotation of said fan air is pumped through said annular opening, and
   power transmitting means drivingly connecting said power takeoff shaft with said fan.

2. The invention of claim 1 wherein a hydraulic jack mounting bracket is connected to each end of said transverse beam.

3. The invention of claim 1 wherein said power transmission means includes a belt pulley on said shaft, a belt pulley on said fan, an endless belt in power transmitting engagement with said pulleys and tensioning means for said belt including a resilient tensioning mechanism connected to said transverse beam.

4. The invention of claim 3 wherein said tensioning means includes a pulley support member adjustably supported on said vehicle and operatively connected to said tensioning mechanism and an idler pulley rotatably mounted on said support member and operatively engaging said belt.

5. The invention of claim 3 wherein a hydraulic jack mounting bracket is connected to each end of said transverse beam.

6. The invention of claim 1 and further comprising a top protective panel releasably secured to said support in overlying relation to said radiator.

7. The invention of claim 6 and further comprising a protective panel releasably secured to said vertical walls and disposed at the longitudinal side of said radiator remote from said engine, said protective panel having air passages therein facilitating movement of air through said radiator by said fan.

8. The invention of claim 7 wherein said radiator support means includes first and second transversely spaced resilient mounts connecting the upper transversely opposite portions of said radiator to said transverse wall and a third resilient mount supporting the lower central portion of said radiator on said support.

9. The invention of claim 8 wherein said third resilient mount is connected to said transverse wall.

10. The invention of claim 1 wherein said radiator support means includes first and second transversely spaced resilient mounts connecting the upper transversely opposite portions of said radiator to said transverse wall and a third resilient mount supporting the lower central portion of said radiator on said support.

* * * * *